Dec. 15, 1970 G. Y. SONODA 3,548,388

STORAGE CELL WITH A CHARGE TRANSFER LOAD INCLUDING SERIES CONNECTED FETS

Filed Dec. 5, 1968 2 Sheets-Sheet 1

INVENTOR
GEORGE Y. SONODA

BY James E. Murray

ATTORNEY

Dec. 15, 1970 G. Y. SONODA 3,548,388

STORAGE CELL WITH A CHARGE TRANSFER LOAD INCLUDING SERIES CONNECTED FETS

Filed Dec. 5, 1968 2 Sheets-Sheet 2

United States Patent Office 3,548,388

Patented Dec. 15, 1970

3,548,388

STORAGE CELL WITH A CHARGE TRANSFER LOAD INCLUDING SERIES CONNECTED FETS

George Y. Sonoda, Poughkeepsie, N.Y., assignor to International Business Machines Corporation, Armonk, N.Y., a corporation of New York Filed Dec. 5, 1968, Ser. No. 781,527
Int. Cl. G11c *11/40*
U.S. Cl. 340—173 5 Claims

ABSTRACT OF THE DISCLOSURE

This specification describes a semiconductor storage cell for use in monolithic memories. The storage cell has two crosscoupled FET's which function as the storage elements of the cell. Each of the crosscoupled FET's is connected across a source for excitation in series with two more load FET's. These additional load FET's are alternately turned on and off out of phase with each other to transfer charge to the crosscoupled FET's from the source of excitation. By operating these load FET's in this manner, two low impedance FET's can be used to simulate a high impedance FET.

BACKGROUND OF THE INVENTION

The present invention relates to semiconductor storage cells and more particularly to FET semiconductor storage cells.

One problem with the use of semiconductor bistable circuits as storage cells and monolithic memories for computers is that they cause heating of the monolithic chips on which they are formed. To keep these chips at an operating temperature it is therefore necessary that the chips be cooled. As the bit density, or the number of cells in a given area of the chips is increased, the heating problems become more critical and very sophisticated and expensive cooling apparatus must be used in order to maintain the memory at an operating temperature level. At even higher bit densities, it becomes impossible to cool the chips with conventional cooling systems. For these reasons dissipation of heat by the cells materially adds to the cost of monolithic computer memories and also is a limiting factor on the speed of operation of the memory and the size of the memory. Therefore, it is desirable to reduce the heat dissipated by the cells. One method of doing this would be to increase the impedance of the elements making up the cells. However this increase in impedance would generally lead to an increase in the size of the cell since an increase in impedance of an element is usually accompanied by an increase in its size. Therefore, the usual case is that the increase in the impedance of an element is self-defeating in that it decreases the bit density and therefore has the opposite effect than its intended purpose.

SUMMARY

In accordance with the present invention, a high impedance is provided without requiring a large area, thus enabling a reduction in size to accompany reduction in cell dissipation. As in most monolithic memories the storage cell of the present invention each have two semiconductor devices which are crosscoupled to form a bistable circuit. The cross-coupled devices are each connected to a source of potential through two serially connected FET's. These serially connected FET's are turned on and off out of phase with each other to transfer energy from the power source to the crosscoupled FET's in two charging steps. Since one of the serially connected FET's is always off at any given time they in combination appear to the source to be an extremely high impedance. Therefore they can be made comparatively small thus allowing a reduction in cell size to accompany the reduction in power dissipation by the cell.

Therefore, it is an object of the present invention to provide storage cells which can be fabricated into monolithic memories.

It is also an object of this invention to provide a storage cell which dissipates very little power.

It is a further object of this invention to provide storage cells which operate at two different power levels.

DESCRIPTION OF THE DRAWINGS

The foregoing and other objects, features and advantages of the invention will be apparent from the following more particular description of the preferred embodiment of the invention as illustrated in the accompanying drawings of which:

Referring to FIG. 1, the sources of the crosscoupled FET devices Q1 and Q2 are connected to the grounded terminal of a two volt power supply while the drains of both FET devices Q1 and Q2 are connected through separate loads to the positive terminal of the same power supply. In accordance with the present invention the load for the FET device Q1 comprises device Q7 and Q5 connected in series with device Q1 across the source and the load for device Q2 includes devices Q6 and Q8 connected in series with device Q2 across the source. The source is in fact a pulsed source A and is connected to the drains and gates of devices Q7 and Q8 so that when the source is pulsed up, devices Q7 and Q8 conduct transferring charge through them from the source to the capacitors C7 and C8. The gates of devices Q5 and Q6 are also connected to a pulsed source B. This pulse source is 180° out of phase with the pulsed source A connected to the gates of devices Q7 and Q8. Thus when devices Q7 and Q8 are conducting, Q5 and Q6 are off preventing charge from transfering directly from the source to the crosscoupled devices. Instead, the charge is temporarily stored in the inherent capacitance of the devices Q7 and Q8 and other stray capacitances until devices Q5 and Q6 are rendered conductive. Then the charge is transferred to the crosscoupled devices. Transferring the charge in two steps where at least one of the devices connected in series is cut off at all times, maintains the apparent impedance between the source and the crosscoupled devices at a very high level thus reducing the power dissipation through the devices. Since power dissipation is reduced the cells can be placed closer together or in other words the bit density can be increased. The pulsed sources A and B may be the out of phase outputs of an astable multivibrator 10 as illustrated in the figure.

Figure 1:
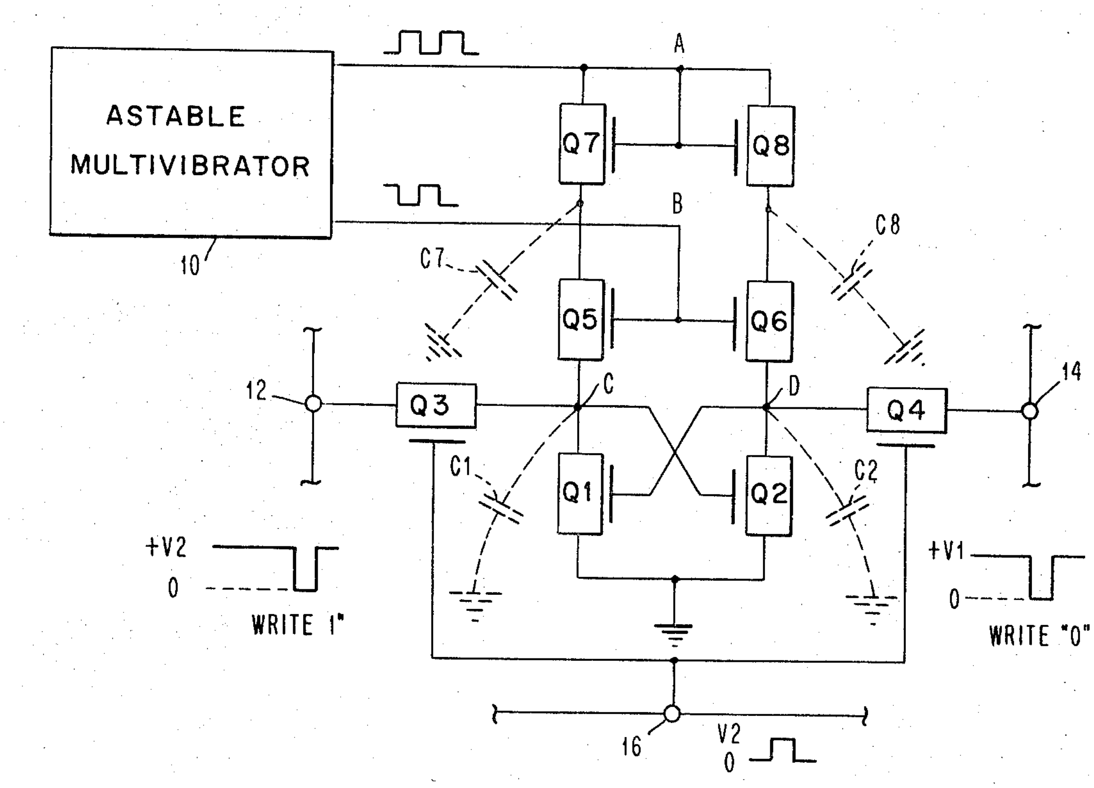
FIG. 1 is a schematic of a storage cell of the present invention.

The power supplied to the storage cell through the load devices Q5 through Q8 is supplied continuously to the storage cell. The values of the potential are selected so that the potential supplied through nodes C and D are just sufficient for the storage cell to maintain its bistable state. However this potential is not sufficient to permit reading of the information stored in the cell without the destruction of the information. As shall be seen later, additional power is supplied to the cell from the bit terminals 12 and 14 when information is being read from the cell.

For the purpose of reading or changing the information stored in the bistable trigger circuit, FET device Q3 couples node C of the trigger to the one bit sense terminal 12 and FET device Q4 couples node D to the zero bit sense terminal 14. The gates of the FET devices Q5 and Q6 are connected together to the word line terminal 16 for the cell so that the potentials at nodes C and D can both be read upon the application of a single read pulse to the word line terminal 16. As will be seen later the signals produced at the zero and one bit sense terminals 12 and 14 as a result of this read pulse are fed into a differential amplifier and compared to see if a "0" or a "1" is stored in the cell.

Let up now assume that the cell is not being addressed either for reading or writing and a "1" is stored in the cell. With a "1" stored in the cell, device Q1 is conducting and device Q2 is off. Conduction through device Q1 lowers node C to approximately ground potential while node B remains approximately at two volts as a result of the charge supplied to nodes C and D through devices Q5 through Q8. Since the cell is not being addressed, devices Q3 and Q4 are biased off by application of the potential V1 (4 volts) to the bit line terminals 12 and 14 and ground potential to the word line terminal 16. Thus the current to maintain device Q1 conducting flows through devices Q6 and Q8 in the step sequence mentioned above. Since the apparent impedance of devices Q6 and Q8 is extremely high the power dissipated at this time is very low. Periods like this when the cell is not being addressed constitute a major portion of the time. Thus this increase in the impedance at this time greatly reduces the power disspiated by the cell.

The magnitude of the potential of the pulsed source A is selected so that the current is the minimum necessary to maintain the state of the trigger. In other words, the minimum necessary to maintain device Q1 on and device Q2 off as a result of the coupling of the drains of the devices Q1 and Q2. However the potential at nodes C and D is not sufficient to permit the non-destructive reading of the information stored in the cell. To prevent destruction of the information stored in the cell during reading, the potential at nodes C and D is raised by excitation supplied to the nodes C and D from the bit terminals 12 and 14. For this purpose the potential at the bit terminals 12 and 14 is maintained at +V1 (approximately 4 volts) while reading. Devices Q3 and Q4 are turned on by a positive interrogation pulse V2 to the word terminal 16. This reduces the impedance of the devices Q5 and Q6 allowing current to flow to the nodes C and D from the terminals 12 and 14. As current flows from terminal 12 to the "on" node C the potential at node C rises. Similarly, as current flows from terminal 14 to the "off" node thus the potential at node D rises. These currents flow along bit lines 13 and 14 to a differential sense amplifier where they are subtracted to provide a differential sense current which identifies the information stored in the cell.

Figure 2:
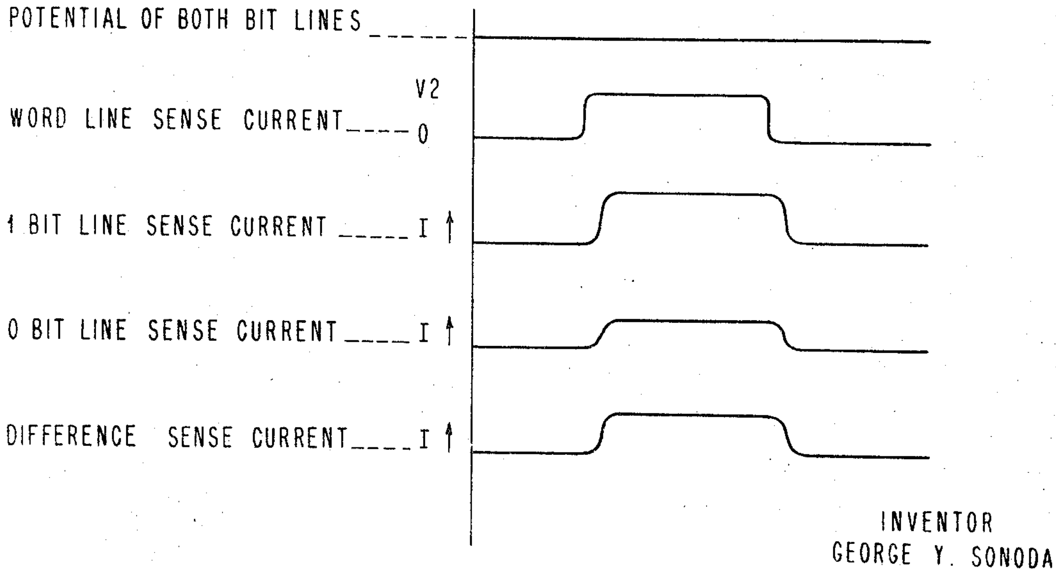
FIG. 2 are curves produced by reading the information stored in the storage cell.

FIG. 2 shows the sequence of voltages and currents occurring during a "1" read cycle.

So far we have described how to read the information stored in the storage cell. To change the information stored in the cell or in other words to write a "0" into the cell, the potential of "0" bit terminal 14 is lowered to ground potential while the potential on the "1" bit terminal is maintained at +V1. Then a positive interrogation pulse is applied ot the word terminal 16 to turn devices Q5 and Q6 on. With terminal 14 biased at ground potential capacitor C2 discharges rapidly towards ground potential through device Q5. As node D drops from +V1 towards ground potential, the potential at node C starts rising starting a regenerating action that ends in device Q2 being turned on and device Q1 being turned off. Devices Q5 and Q6 may then be turned off leaving the cell in its "0" storage state. To switch from the "0" storage state to the "1" storage state a similar process is employed except this time the potential at terminal 12 is decreased to lower the voltage at node C while devices Q5 and Q6 are conducting. This will turn device Q2 off which raises the voltage at node D and allows device Q1 to go on.

Figure 3:
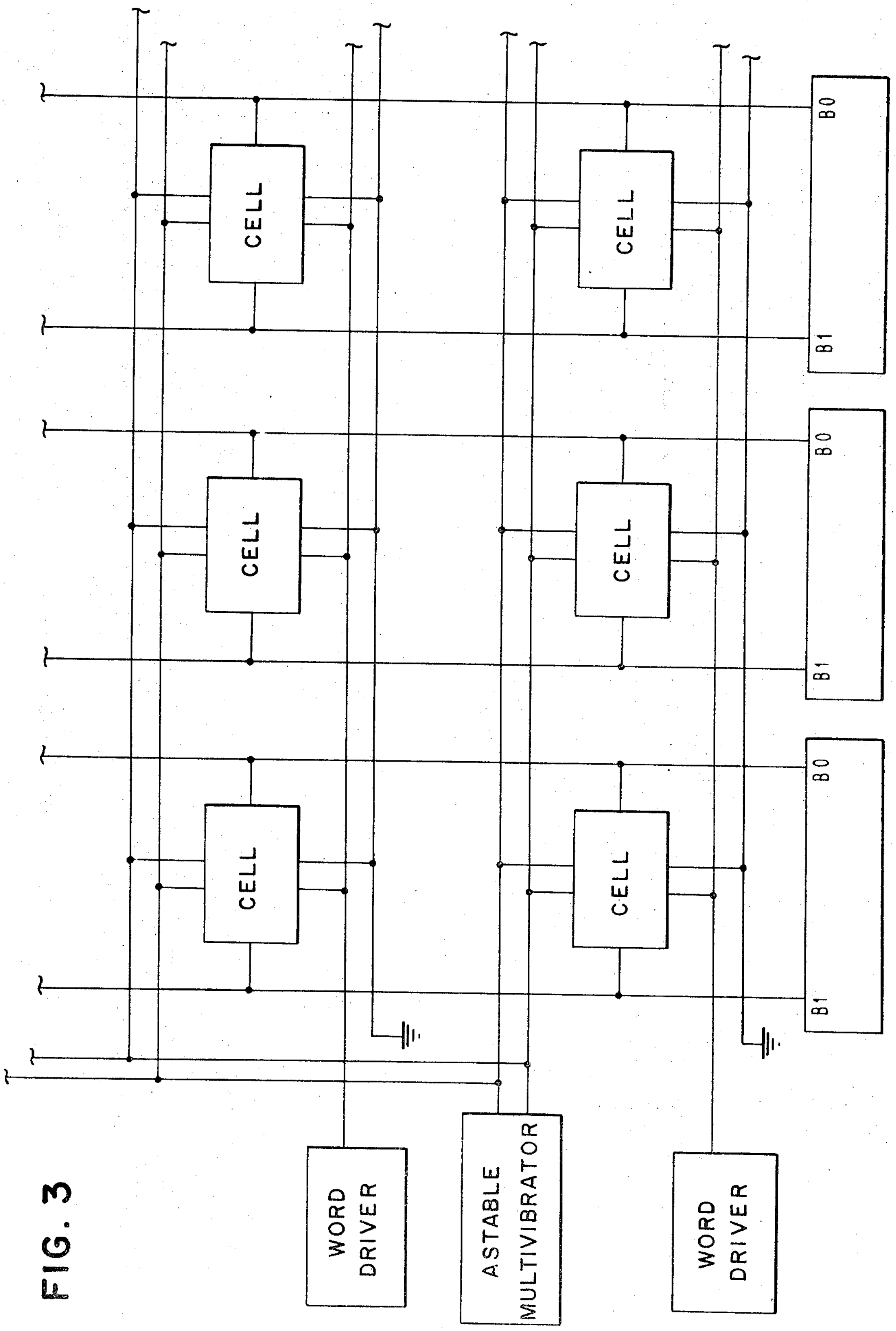
FIG. 3 is a schematic illustrating how the storage cell of the present invention may be hooked into matrices so as to form memory arrays.

A multiplicity of the a bove described cells can be coupled together as shown in FIG. 3 and used to form matrices that perform memory functions.

In the above storage cell the sources A and B are 180° out of phase with each other. That is to say, either transistors Q5 and Q6 or Q7 and Q8 are conducting at all times. However, if it is desired there can be periods at which all the transistors Q5 to Q8 are not conducting. Likewise, the advantages of the present invention can be obtained if the conduction of the transistors Q5 and Q6 and transistors Q7 and Q8 can partially overlap and still obtain the advantages of the present invention. Furthermore, the drains of transistors Q7 and Q8 may be separated from pulse source A to a separate, lower voltage, D.C. voltage source.

Therefore, while the invention has been particularly shown and described with reference to a preferred embodiment thereof, it will be understood by those skilled in the art that various changes in form and details may be made therein without departing from the spirit and scope of the invention.

What is claimed is:

1. In a storage cell having a pair of crosscoupled semiconductor devices each connected by a load to a source of potential, the improvement comprising:

(a) two serially connected FET's in each such load for coupling the source of potential to the crosscoupled semiconductor devices; and (b) biasing means for rendering the two serially connected FET's conductive out of phase with each other so as to simulate a high impedance.

2. The storage cell of claim 1 wherein said biasing means is an astable multivibrator with two out of phase outputs.

3. The storage cell of claim 2 wherein said crosscoupled semiconductor devices are FET's.

4. The storage cell of claim 3 wherein each set of serially connected FET's is connected between the gates of one of the crosscoupled FET's and the source of potential.

5. The storage cell of claim 4 wherein one output of the astable multivibrator is the gate voltage for the FET in each set of serially connected FET's which is connected to the gate of the crosscoupled FET's and the other output of the astable multivibrator is the gate and drain voltage for the FET in each set of serially connected FET's which is connected to the drains of the first set of FET's.

References Cited

UNITED STATES PATENTS 3,363,115 1/1968 Stephenson ---------- 340—173

TERRELL W. FEARS, Primary Examiner

U.S. Cl. X.R.

307—238, 279, 291